United States Patent [19]

Sparr, Sr.

[11] 3,989,388
[45] Nov. 2, 1976

[54] FOUNTAIN-TYPE PIPE CLEANING BRUSH

[76] Inventor: Anders V. Sparr, Sr., Rte. 1, Box 272, Milligan Road, Waupun, Wis. 53963

[22] Filed: Sept. 17, 1975

[21] Appl. No.: 614,741

[52] U.S. Cl. .............................. 401/11; 401/188 R; 401/289
[51] Int. Cl.² .................................. A46B 11/00
[58] Field of Search .............................. 401/9–11, 401/187, 188, 268–291; 15/104.04, 160, 206, 256.6, 210, 230.11

[56] References Cited
UNITED STATES PATENTS

| 753,125 | 2/1904 | Cooper | 401/287 |
|---|---|---|---|
| 1,173,194 | 2/1916 | Kohl et al. | 401/290 X |
| 1,304,094 | 5/1919 | Quimby | 401/291 |
| 1,633,382 | 6/1927 | Koester | 15/256.6 |
| 3,020,579 | 2/1962 | O'Connor | 401/188 |
| 3,535,047 | 10/1970 | Vireno | 401/10 |

FOREIGN PATENTS OR APPLICATIONS

| 54,250 | 11/1967 | Poland | 401/10 |
|---|---|---|---|
| 405,998 | 7/1966 | Switzerland | 401/9 |

*Primary Examiner*—Lawrence Charles
*Attorney, Agent, or Firm*—Clarence A. O'Brien; Harvey B. Jacobson

[57] ABSTRACT

A handle defining shank is provided and terminates at one end portion in a partial circular loop section of at least 300° angular extent and equipped with generally radially outwardly projecting and circumferentially spaced bristles. The bristles are spaced along the loop section and the latter additionally includes a flexible liquid supply pipe extending therealong, including an inlet end portion supported from the other end of the shank portion. The inlet end portion of the tube is adapted for communication with the source of liquid under pressure and the extent of the flexible tube extending about the loop section includes a plurality of outlets spaced therealong opening inwardly toward the central area of the zone bound by the loop section. Further, the loop section is constructed of shape retentive but bendable and resilient material, whereby the loop section may be at least slightly expanded for engagement over a cylindrical member to be cleaned by the bristles.

4 Claims, 3 Drawing Figures

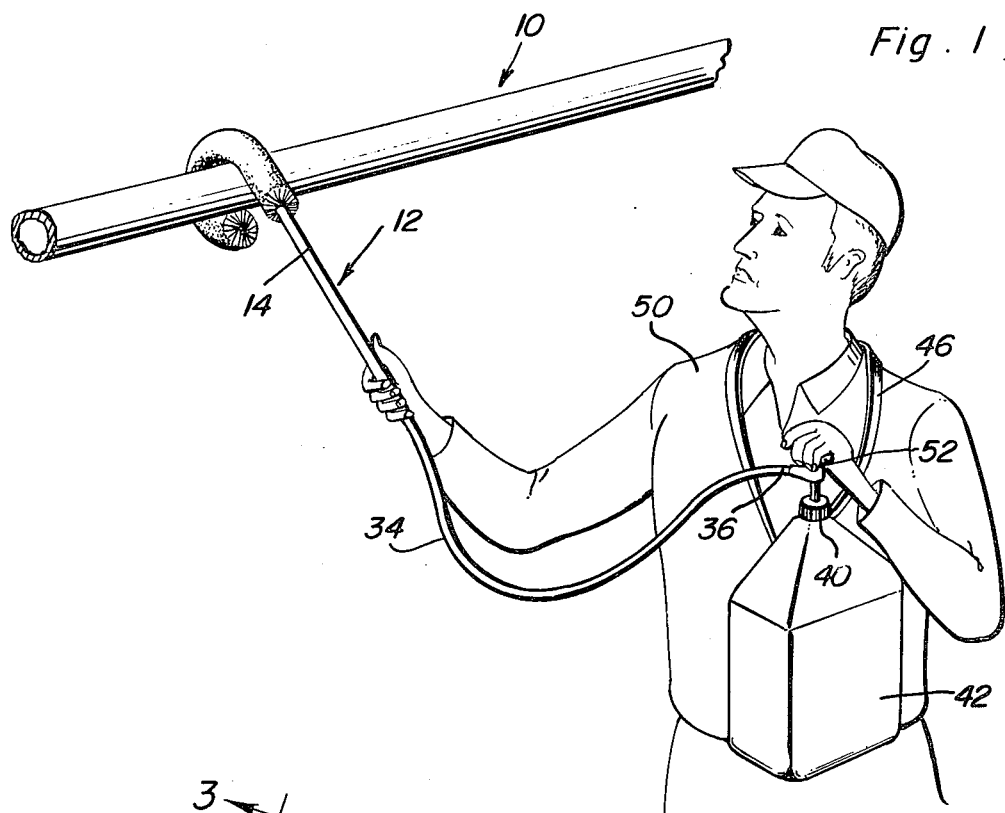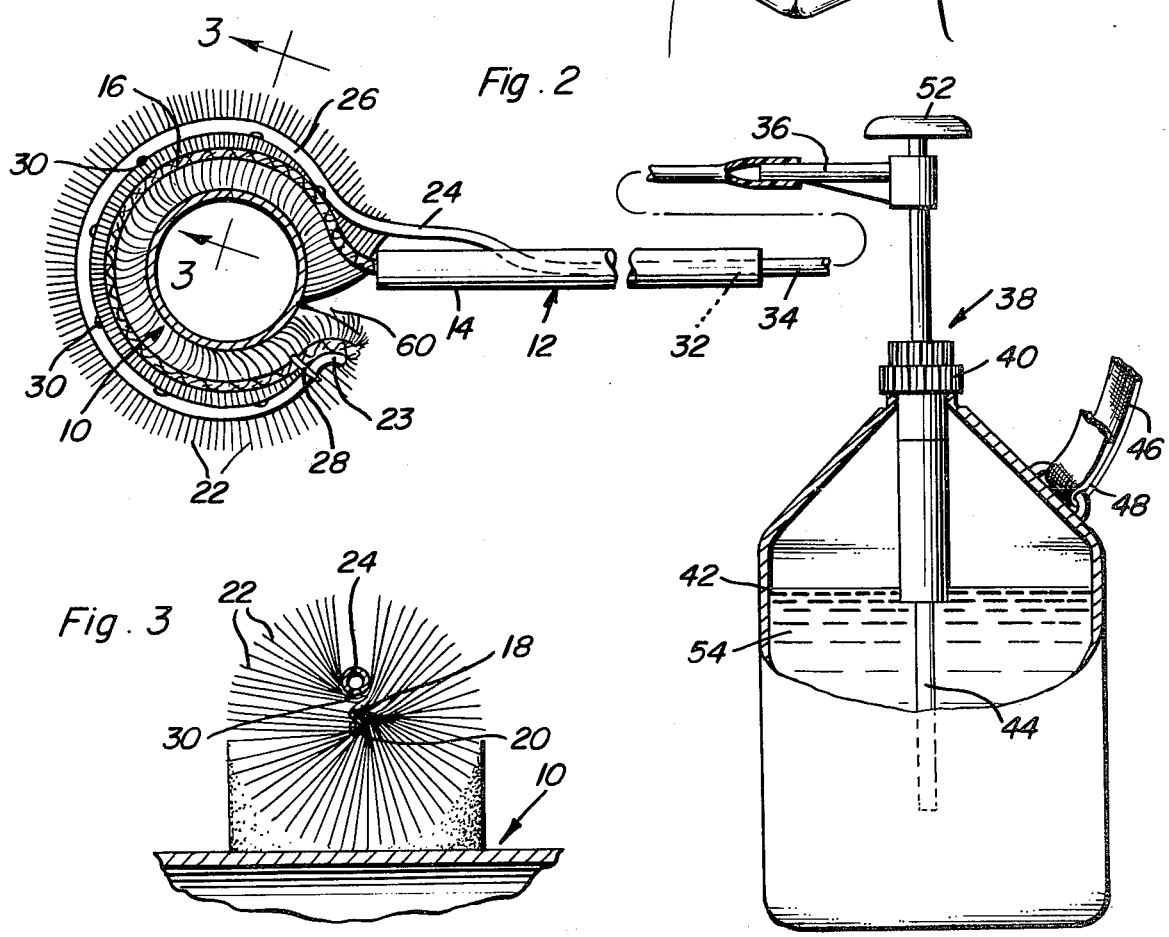

FOUNTAIN-TYPE PIPE CLEANING BRUSH

BACKGROUND OF THE INVENTION

Various forms of fountain-type cleaning brushes and other similar devices have been heretofore designed. In addition, various structures have been heretofore designed and utilized in cleaning pipes.

Examples of previously patented fountain-type brushes are disclosed in U.S. Pat. Nos. 24,491, 361,584, 745,405, 840,604, 1,068,719, 1,118,774, 1,304,094, and 1,575,809. However, these previously designed fountain-type brushes are not well suited for cleaning pipes.

The various other forms of equipment utilized to clean pipes include brushes of the non-fountain-type, rags and sponges. However, such other cleaning structures are also not well suited to clean pipes.

In dairy barns considerable care must be taken to clean milk pipe lines on the outside as well as on the inside. Such pipe lines experience the accumulation of dust and dirt on the exteriors thereof, especially around stallcocks where milk hoses are attached to the pipe line.

Present practice involves the use of a rag or sponge which has been wetted with a heated cleaning solution and accordingly, the task of cleaning the exterior of overhead milk pipe lines is tedious and messy inasmuch as there is a tendency for the cleaning solution to run down a person's arm while he is cleaning overhead pipe lines.

BRIEF DESCRIPTION OF THE INVENTION

The fountain-type brushes of the instant invention has been constructed of a configuration to closely embrace and extend substantially fully around a cylindrical pipe line. The brush is provided with liquid dispensing structure extending about that portion of the brush which embraces the pipe line to be cleaned and accordingly, the cleaning solution utilized in cleaning pipe lines is applied to the pipe lines being cleaned throughout substantially their entire circumference. Further, the fountain brush is provided with a handle structure enabling the cleaning of overhead pipe lines by a person disposed beneath but to one side of the pipe lines.

The main object of this invention is to provide a fountain-type pipe cleaning brush specifically adapted to clean overhead milk pipe lines in a dairy barn.

Another object of this invention is to provide a fountain-type brush which may be utilized in cleaning various different forms of cylindrical objects.

Yet another object of this invention is to provide a fountain-type pipe cleaning brush which may be readily engaged with and disengaged from a pipe line being cleaned.

A further object of this invention is to provide a fountain-type brush for cleaning pipes which will enable an overhead pipe to be cleaned by a person disposed below the level of the pipes but spaced to one side thereof.

A final object of this invention to be specifically enumerated herein is to provide a fountain-type brush in accordance with the preceding objects and which will conform to conventional forms of manufacture, be of simple construction and easy to use, so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view illustrating the fountain-type brush of the instant invention in use in cleaning the exterior of a milk pipe line;

FIG. 2 is a side elevational view of the fountain-type brush with portions thereof being broken away and an associated hand pump equipped liquid reservoir with portions of the latter being broken away and illustrated in vertical section; and FIG. 3 is an enlarged fragmentary sectional view taken substantially upon the plane indicated by the section line 3—3 of FIG. 2.

DETAILED DESCRIPTION OF THE INVENTION

Referring now more specifically to the drawings, the numeral 10 generally designates an overhead milk pipe line to be cleaned and the numeral 12 generally designates a fountain-type brush constructed in accordance with the present invention specifically adapted to clean the exterior of cylindrical objects such as the pipe line 10.

The brush 12 includes a shank portion 14 equipped with a partial circular loop section 16 at one end. The loop section 16 comprises a pair of twisted spring wire sections 18 and 20 having brush bristles 22 clamped therebetween. The bristles 22 include opposite end portions which extend generally radially outwardly from the wires 18 and 20 and the bristles 22 are spaced circumferentially about the wires 18 and 20 and spaced along the loop section 16.

The shank portion comprises an elongated handle in whose end adjacent the loop section 16 one pair of corresponding ends of the wires 18 and 20 are embedded for support of the loop section 16 from the handle.

It will be noted from FIG. 2 of the drawings that the loop section 16 is at least 300° in angular extent, leaving an entrance throat 60 which is less than 60° in angular extent about the central area of the zone bound by the loop section 16, and that the free terminal end of the loop section 16 is reversely curved as at 23.

Because the wires 18 and 20 are constructed of stiff but bendable and resilient material, the loop section 16 may be expanded so as to increase the angular extent of the throat 16 for ease of insertion of the loop section 16 over the pipe 10 in the manner illustrated in FIGS. 1 and 2 of the drawings.

A flexible liquid supply line 24 is provided and includes one end portion 26 which extends about the loop section 16 from the shank portion 14 to the free end of the loop section 16 at which point the flexible tube 24 is secured to the loop section 16 as at 28. The end portion 26 comprises an outlet end portion of the flexible tube 24 and is equipped with longitudinally spaced outlets openings 30 spaced therealong and which open inwardly toward the central area of the zone bound by the loop section 16, the end of the end portion 26 secured as at 28 to the loop section 16 being suitably closed.

The handle or shank portion 14 includes an endwise outwardly opening longitudinal bore 32 in its end remote from the loop section 16 and bore 32 opens laterally outwardly of the handle 14 intermediate its opposite ends and receives the inlet end portion 34 of the tube 24 therethrough.

The inlet end portion 34 of the tube 24 is telescoped over the discharge nozzle 36 of a hand pump assembly referred to in general by the reference numeral 38 supported from the closure cap 40 of a reservoir 42 down into which a pickup tube 44 of the hand pump assembly 38 extends.

The reservoir 42 is equipped with a supportive strap 46 having its opposite ends secured to the reservoir 42 as at 48 and the strap 46 may therefore be looped about the neck of the user of the brush 12 in the manner illustrated in FIG. 1 of the drawings. Thereafter, the user 50 may support the handle 14 of the brush 12 in one hand and operate the pump plunger 52 with his other hand. Thus, it may be seen that the brush 12 may be readily engaged with the pipe 10 and moved back and forth along the exterior of the pipe 10 while a suitable cleaning solution 54 from within the reservoir 42 is pumped therefrom through the flexible tube 24 and out the outlet openings 30 spaced about the loop section 16. Of course, as cleaning solution is discharged from the openings 30, it fully saturates the brush bristles 22 and the latter thereby transfer the cleaning solution from the brush to the exterior surfaces of the pipe 10 for cleaning the latter. Also, the reservoir 42 and pump assembly 38 may be used in conjunction with a brush including a head of different configuration.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A fountain-type pipe cleaning brush including a shank portion terminating at one end in a partial circular loop section including a base end portion supported from said one end of said shank portion and a free end portion which curves toward and terminates a distance closely spaced from said base end portion, said loop section being equipped with generally radially outwardly projecting and circumferentially spaced bristles spaced along said loop section as well as an elongated liquid supply tube extending along said loop section in the plane thereof and closely paralleling and spaced slightly outwardly of the outer periphery of said loop section, said supply tube including an inlet end portion supported from the other end of said shank and a closed end portion supported from said free end portion, said inlet end portion being adapted for communication with a source of liquid under pressure, said liquid supply tube including a plurality of liquid outlets spaced therealong and opening inwardly toward said loop section and the base ends of said bristles supported from said loop section, said loop section being constructed of shape retentive but bendable and resilient material, whereby said loop section may be at least slightly expanded for engagement over a cylindrical member to be cleaned by said bristles.

2. The combination of claim 1 wherein said free end portion of said loop section includes a reversely curving terminal end portion curving away from said base end portion.

3. The combination of claim 1 wherein said partial loop section is of at least 300° in angular extent.

4. The combination of claim 1 including a reservoir, a support strap anchored to said reservoir and adapted to support said reservoir from the body of the user of said brush, said reservoir including a pump having a manually operable actuator and a liquid outlet, and a flexible hose communicating said outlet with said inlet end of said liquid supply passage means.

* * * * *